Sept. 28, 1954 H. S. TAYLOR 2,690,380
PRODUCTION OF DEUTERIUM OXIDE
Filed May 4, 1944 3 Sheets-Sheet 2

INVENTOR
HUGH S. TAYLOR
BY-
ATTORNEY

INVENTOR
HUGH S. TAYLOR
BY-
ATTORNEY

Patented Sept. 28, 1954

2,690,380

UNITED STATES PATENT OFFICE 2,690,380

PRODUCTION OF DEUTERIUM OXIDE

Hugh S. Taylor, Princeton, N. J., assignor to the United States of America as represented by the United States Atomic Energy Commission Application May 4, 1944, Serial No. 534,169

17 Claims. (Cl. 23—204)

This invention relates to isotope concentration and more particularly it relates to an improved process for increasing the concentration of a desired isotope in a liquid or gas containing a plurality of isotopes of an element.

It is now well established that some chemical elements exist in two or more atomic forms called isotopes and that the different isotopes of an element have the same atomic number but different atomic weights. In some cases individual isotopes have unique properties which differ from the properties exhibited by the mixture of isotopes comprising the chemical element as it normally occurs, and it is highly desirable that methods be available for separating such isotopes from the mixture so that they may be studied and used.

The problem of separating such isotopes is in many cases a difficult one. Since istopes are different forms of a single chemical element, their chemical properties tend to be practically identical and hence it is usually not feasible to employ chemical methods to effect a separation. Furthermore, the isotopes of an element usually have physical properties which are closely similar and hence there are numerous instances where it is impracticable to make a separation by employing well-known separative techniques which depend upon difference in physical characteristics such as, for example, differences in vapor pressure. Some of the most interesting and useful isotopes occur only in very small concentrations and an unusually effective method of separation is required to increase the concentration of such isotopes to the desired extent within a reasonable length of time.

It has previously been suggested that the concentration of a desired isotope present in a particular substance might be increased by making use of an isotope exchange reaction. In particular, it has been suggested that the hydrogen isotope known as deuterium might be concentrated by employing an isotope exchange reaction wherein liquid water and hydrogen gas are the reactants and an exchange is caused to take place between deuterium and the light hydrogen isotope known as protium. Water as it naturally occurs contains deuterium in the form of deuterium oxide and/or DOH to the extent of about one part in seven thousand by weight and hydrogen gas may contain a greater or smaller concentration of deuterium depending upon the way in which it is made. Water and hydrogen, either or both of which contain deuterium, when in contact with each other tend to approach an isotopic equilibrium which may be represented by the following equation:

$$K = \frac{HDO \text{ (liquid)}/H_2O \text{ (liquid)}}{HD \text{ (gas)}/H_2 \text{ (gas)}}$$

wherein $K$ = a constant at any given temperature, $HDO/H_2O$ = the molal ratio of the deuterium-containing species to the non-deuterium containing species of water in the liquid phase, and $HD/H_2$ = the molal ratio of the deuterium-containing species to the non-deuterium containing species of hydrogen in the vapor phase.

Stated in words the above expression shows that the equilibrium distribution of deuterium between hydrogen gas and water is a constant at any temperature. At room temperature the value of K is about 4 which means that the equilibrium distribution is such that the concentration of deuterium in the liquid water is about four times as great as in the gaseous hydrogen. If, for example, the concentration of deuterium in the liquid water is only three times as great as that in the gas, an isotope exchange reaction will tend to occur, that is, deuterium will tend to move from the hydrogen to the water and protium from the water to the gas phase. It is theoretically possible by employing countercurrent flow of hydrogen gas and liquid water to cause hydrogen having a given concentration of deuterium to be successively depleted with respect to deuterium and to cause the countercurrently flowing water to be successively enriched with respect to deuterium, thereby increasing the concentration of the deuterium - containing species in the liquid water.

Although it is possible, in theory, to increase the concentration of a desired isotope in a liquid by the above procedure, there are practical difficulties which limit its effectiveness in use. The rate at which such an isotope exchange reaction proceeds between liquid and gas is exceedingly slow, and a long period of time is required to reach equilibrium. Even when highly active catalysts are used to accelerate the reaction an excessively long period of time is ordinarily required to reach equilibrium.

It is an object of the present invention to provide an improved method of concentrating a desired isotope in a liquid material or gas by isotope exchange between the material and the gas.

It is a further object of the invention to provide a method of increasing the concentration of a desired isotope in a substance by an isotope exchange reaction having a relatively high reaction rate.

It is still another object of the invention to provide a more effective, economical and faster method of increasing the concentration of combined deuterium in water.

It is still a further object of the invention to provide an improved method for effecting an exchange of isotopes between two materials by causing the exchange reaction to take place in the vapor phase.

Other objects of the invention will be in part obvious and in part pointed out hereinafter.

In one of its broader aspects the present invention comprises a method of concentrating a desired isotopic species of an element in a liquid or gas by exchange of isotopic species between the vapor of the liquid and a gas wherein both the liquid and gas contain the element and both are capable of containing the desired isotopic species, characterized by the steps of forming a mixture of the gas and the vapor of the liquid, passing the vapor-gas mixture at a relatively low temperature over a catalyst to cause an exchange of isotopic species to take place, and thereafter separating the vapor and gas to recover a product, either the gas or the vapor, which is enriched with respect to the desired isotopic species.

In a somewhat narrower aspect the present invention comprises a method of concentrating a desired isotopic species in a liquid by exchange of isotopes between the vapor of the liquid and a gas, both of which are capable of containing the desired isotopic species, characterized by the fact that a countercurrent flow of the liquid and gas is established and the gas containing vapor of the liquid is passed alternately through bodies of the liquid having successively decreasing concentrations of the desired isotope and over catalyst masses to bring about an exchange of isotopes between the gas and vapor in such manner that the gas is successively depleted with respect to the desired isotope and the liquid is successively enriched with respect to the desired isotope.

For purposes of simplicity and clarity, the method of the present invention will first be described as applied to the problem of concentrating the deuterium-containing species in water, although as the description proceeds it will be apparent that the method may also be used in concentrating other desired isotopes in other media as well. I have discovered that the rate at which the isotope exchange reaction between hydrogen and water proceeds may be enormously increased by causing the reaction to occur in the vapor phase, that is, in the absence of liquid water, and more particularly I have found that such a vapor phase exchange reaction may be carried out most effectively at temperatures below the boiling point of water. In accordance with the method of the present invention the exchange reaction between the several isotopic species in hydrogen and water vapor can be carried rapidly to equilibrium at a relatively low temperature in the presence of a variety of catalysts of which platinum, palladium, and nickel may be cited as typical examples. In contact with suitable preparations of such catalysts, hydrogen and water vapor containing deuterium react rapidly to establish equilibrium in the isotope exchange reaction:

$$H_2O \text{ (vapor)} + HD \text{ (gas)} \rightleftarrows HDO \text{ (vapor)} + H_2 \text{ (gas)}$$

The way in which the above reaction may be used to increase the concentration of the deuterium-containing species in water in accordance with the method of the present invention may be best understood by reference to the accompanying drawings which show apparatus capable of carrying out the method of the invention and wherein.

Figure 1:
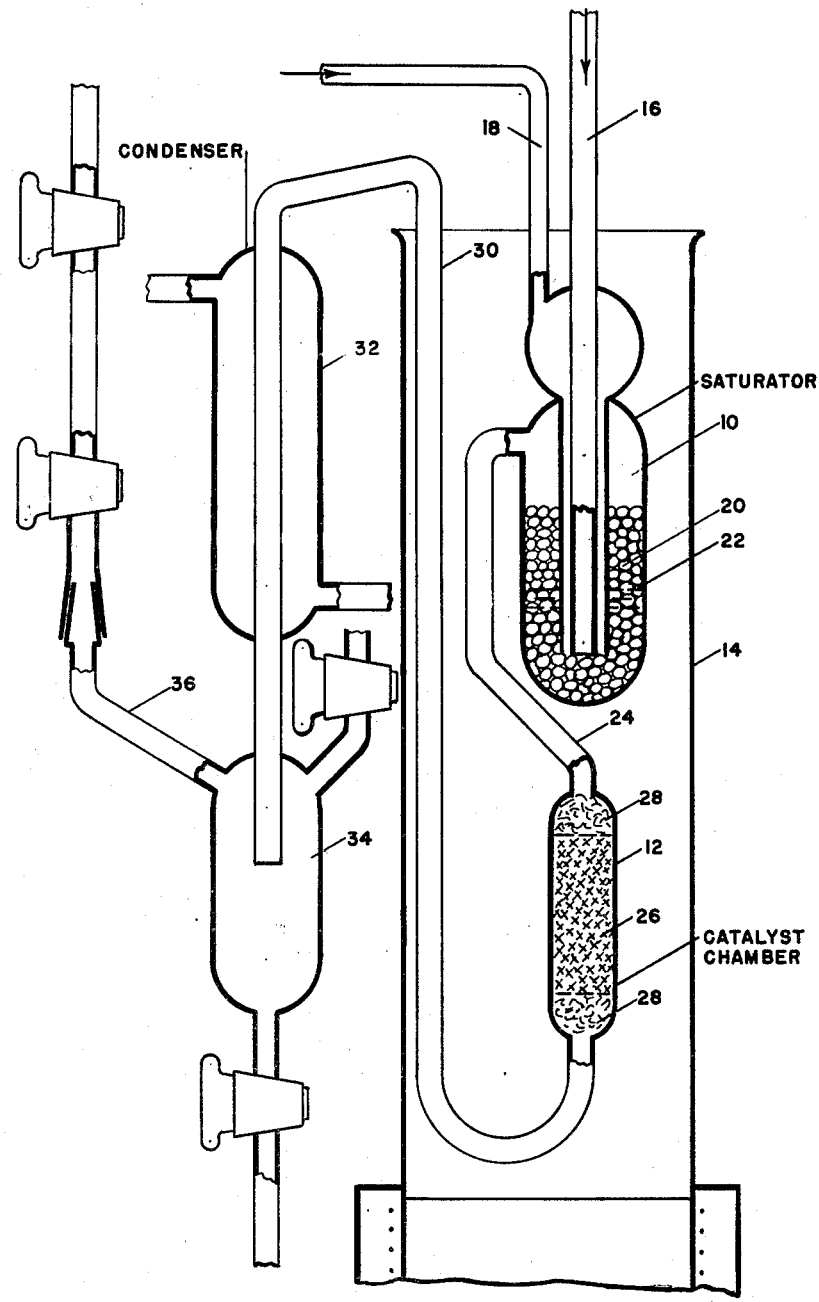
Fig. 1 is a diagrammatic view of a single exchange unit for effecting an exchange of isotopes between water vapor and hydrogen gas.

Referring to the drawings, Fig. 1 shows a single-exchange unit comprising a saturating chamber 10 and a catalyst chamber 12 enclosed in a vapor bath 14 which serves to maintain the saturating chamber and catalyst chamber at a desired constant temperature. In a typical case, benzene vapor was used at atmospheric pressure to maintain the temperature of the saturator and catalyst chamber at about 80° C. The saturator 10 is provided with an inlet conduit 16 for water and an inlet conduit 18 for hydrogen gas. The inlet conduits 16 and 18 extend to a point near the bottom of the saturator 10 and the chamber is packed to about two-thirds of its height with granules or pellets of a suitable inert material such as, for example, the glass beads 20. Liquid water containing, for example, the natural abundance of the deuterium-containing species (about 0.02% by weight) is introduced into the chamber 10 through conduit 16 at such a rate as to maintain a water level within the chamber at 22. Hydrogen gas containing more than the equilibrium concentration of deuterium is introduced into the chamber 10 through conduit 18 and bubbles up through the water in the chamber thereby becoming saturated with water vapor at the temperature existing within the chamber. At 80° C. the saturated hydrogen gas comprises approximately equal volumes of water vapor and hydrogen. The rate of flow of hydrogen and water vapor depends upon a number of factors which are discussed in detail below.

The mixture of hydrogen and water vapor leaves chamber 10 through conduit 24 and passes to and through the catalyst 26 contained in the catalyst chamber 12. The ends of the chamber 12 are preferably packed with a material such as the glass wool 28 to retain the catalyst 26 in place within the chamber 12. An exchange reaction takes place within the catalyst chamber 12 whereby deuterium in the hydrogen gas exchanges with protium in the water vapor to increase the concentration of the deuterium-containing species in the water vapor.

The mixture of hydrogen and water vapor leaves the chamber 12 through a conduit 30 and passes to a condenser 32 wherein most of the water vapor is condensed to liquid water. The condensed water which is enriched in the deuterium-containing species is collected in a chamber 34 and the hydrogen gas which is impoverished in the deuterium-containing species leaves the system through a conduit 36.

The extent to which an exchange of deuterium and protium takes place between hydrogen and water vapor in such a single-exchange unit depends upon numerous variables, among which may be mentioned the temperature at which the reaction is carried out, the space velocity of the vapors passing through the catalyst bed, and the activity of the catalyst used.

The reaction temperature has a twofold effect on the extent to which an exchange occurs. Both the ratio of water vapor to hydrogen in the reaction mixture and the equilibrium distribution of deuterium between the hydrogen and water vapor depend upon and vary with temperature. Assuming that the hydrogen gas is completely saturated with water vapor, the water vapor-hydrogen ratio depends upon the vapor pressure of water at the reaction temperature and hence as the reaction temperature is increased, this ratio increases correspondingly. Assuming a constant equilibrium distribution of deuterium between the hydrogen and water vapor at varying temperatures and assuming that equilibrium is attained, the total quantity of deuterium which passes to the water vapor in a single exchange increases as the water vapor-hydrogen ratio increases. Hence, from this point of view, it is desirable that the reaction be carried out at a relatively high temperature.

On the other hand, the advantage of increasing the reaction temperature to increase the water vapor-hydrogen ratio is offset, in part, by the fact that the equilibrium distribution of deuterium becomes less favorable as the reaction temperature is increased. The equilibrium constant for the exchange reaction may be represented by the following expression:

$$K = \frac{HDO\ (vapor)/H_2O\ (vapor)}{HD\ (gas)/H_2\ (gas)}$$

It should be noted that the numerical values of the constant K for the exchange reaction between water vapor and hydrogen containing deuterium differ from those for the reaction between liquid water and hydrogen containing deuterium. The best available data for the variation of these constants with temperature are given in the following table.

| Temperature in ° C. | K for Water Vapor | K for Liquid Water |
|---|---|---|
| 0 | 4.19 | 4.59 |
| 25 | 3.62 | 3.92 |
| 50 | 3.20 | 3.37 |
| 75 | 2.88 | 3.02 |
| 100 | 2.63 | 2.70 |
| 125 | 2.43 | |

Although the equilibrium for the liquid water reaction is slightly more favorable than that for the water vapor reaction, the very large increase in reaction rate that is attained by using the method of the present invention far outweighs the disadvantage of a slightly less favorable equilibrium distribution of deuterium.

From the data given in the above table it follows that the lower the temperature at which the exchange reaction is carried out, the greater is the equilibrium ratio of deuterium in the water vapor to deuterium in the hydrogen. Thus, there are two opposing factors which both vary with temperature. As the temperature is increased, the water vapor-hydrogen ratio becomes more favorable and the equilibrium distribution of deuterium becomes less favorable, whereas, as the temperature is lowered, the water vapor-hydrogen ratio becomes less favorable and the equilibrium distribution of deuterium becomes more favorable. It has been found that practicable working temperatures when the exchange reaction is carried out at atmospheric pressure lie below the boiling point of water, preferably in the range between about 45° C. and 90° C. wherein the volume ratio of water vapor to hydrogen gas varies from about 1:10 to 1:0.5. With operating pressures of hydrogen greater than atmospheric pressure, the upper limit of temperature can in practice be increased correspondingly. However, the exchange reaction between hydrogen and water vapor when carried out at substantially atmospheric pressure proceeds so rapidly that it is not ordinarily necessary to resort to the use of super-atmospheric pressures.

As pointed out above, the extent to which an exchange takes place depends not only upon the temperature used but also on the space velocity of the gas-vapor mixture and on the activity of the catalyst used. Space velocity may be defined as the ratio of the volume rate of flow of gas at standard temperature and pressure to the apparent volume of the catalyst bed through which the vapors flow. In the specific examples given below, space velocity is given in terms of the ratio of the volume of dry hydrogen measured at standard conditions passed through the catalyst per hour to the apparent volume of the catalyst bed. Space velocity and catalyst activity are interrelated, that is, when a highly active catalyst is employed, equilibrium conditions may be established at higher space velocities than when a catalyst of lower activity is employed. Thus, when all other variables are maintained constant, the maximum space velocity which may be used to achieve equilibrium may be taken as a measure of catalyst activity. The relationship between space velocity and catalyst activity will be further apparent from a consideration of the specific examples given below.

Catalysts that are operative in accelerating the exchange reaction of the present invention include noble metal catalysts of the platinum group such as platinum, palladium, and rhodium as well as base metal catalysts such as nickel, zinc, cadmium, copper, and cobalt. Platinum and nickel catalysts appear to be the most effective in accelerating the exchange reaction and the other metals somewhat less effective as indicated by the specific examples given hereinafter.

When metals are used as catalysts, they are preferably employed in a high state of dispersion by suitable preparative methods. Thus, whereas platinum powder prepared by fusion of platinum salts in sodium nitrate (Adam's platinum catalyst) shows a relatively small activity, platinum distributed on porous supports such as activated charcoal, activated alumina, Alundum, and silica gel shows very much greater activities and high space velocities become practicable. Similarly, nickel catalysts spread on such supports as kieselguhr, chromic oxide, cerium oxide, thorium oxides, pumice, and alumina show higher space velocities per unit weight of nickel than nickel obtained by reduction of precipitated nickel hydroxide. Palladium is enhanced in activity when disposed in the manner outlined for platinum but possesses, in general, a somewhat lesser activity than platinum. Mixtures of platinum with palladium or rhodium do not appear to possess characteristics superior to that of platinum alone.

It has been further found that heavy metal chromites prepared, for example, by ignition of metal ammonium chromates and subsequent reduction in hydrogen have fair activities around 80° C. especially with small water vapor-hydrogen ratios. Zinc, copper, cadmium, and nickel chromites have shown some activity in accelerating the exchange reaction of the present invention.

The following specific examples are given to illustrate different types of catalysts that may be effectively used in carrying out an exchange of isotopes in accordance with the method of the present invention and to demonstrate the remarkable increases in reaction rate that the method makes possible. All ratios are on a volume basis unless otherwise indicated. In Examples 1 to 9 which follow the hydrogen used was of natural isotopic composition and was saturated with the vapor of water containing about 3% deuterium oxide and then passed over the specified catalyst at the specified space velocity and temperature, thereby increasing the concentration of deuterium in the hydrogen at the expense of the water.

*Example 1.*—A quantity of activated coconut charcoal having an apparent volume of 100 cc. was impregnated with 4 g. of platinum in the form of a dilute solution of platinic chloride by boiling the charcoal in the solution, decanting the residual solution, washing the charcoal with distilled water, and drying at 110° C. A quantity of this catalyst having an apparent volume of 1 cc. was used and hydrogen saturated with water vapor at 80° C. as described above was passed through this catalyst to effect an exchange of deuterium between the water vapor and the hydrogen. Analysis of the exit hydrogen showed that isotropic equilibrium between the hydrogen and water vapor was established at all space velocities between 1,000 and 60,000.

Using the same catalyst with hydrogen gas saturated at 64.6° C., equilibrium conversions were obtained at space velocities up to 10,000. At a space velocity of 60,000 and a temperature of 65° C., 93.5% of equilibrium conversion was attained.

Using the same catalyst and hydrogen saturated at 56.5° C., a conversion equivalent to 80.5% of equilibrium was attained at a space velocity of 60,000, 90.5% of equilibrium at a space velocity of 30,000, 97% at 10,000, 98% at 5,000, and 99.5% at 1,000.

As pointed out in more detail hereinafter, such space velocities are far higher than those attainable in the reaction between hydrogen and liquid water.

*Example 2.*—An activated coconut charcoal impregnated with 1.1% by weight of platinum metal deposited from a commercial platinic chloride solution as described in Example 1 was tested with hydrogen-water vapor mixture at a space velocity of 30,000 and the following conversions were obtained at the indicated temperatures:

| Temp., ° C. | Percent of Equilibrium Conversion |
|---|---|
| 56.5 | 98 |
| 19.9 | 88 |
| 6.4 | 50 |

*Example 3.*—A steam activated coconut charcoal, 8 mesh, was impregnated with 0.1 g. of platinum metal per 100 cc. apparent volume of catalyst. The following conversions were obtained at various space velocities:

| Temp., ° C. | Percent of Equilibrium Conversion | | | | |
|---|---|---|---|---|---|
| | S. V. 1,000 | S. V. 5,000 | S. V. 10,000 | S. V. 30,000 | S. V. 60,000 |
| 80 | 100 | 96 | 86 | 74 | 48 |
| 64.6 | 99 | 91 | 76 | 51 | 45 |
| 56.5 | 100 | 97 | 85 | 53 | 44 |

*Example 4.*—A commercial preparation of platinum on $\frac{5}{32}''$ alumina pellets containing 1 g. of platinum per 100 cc. apparent volume of catalyst gave the following percent of equilibrium conversion at the indicated space velocities and temperatures:

| Temp., ° C. | Percent of Equilibrium Conversion | | | |
|---|---|---|---|---|
| | S. V. 500 | S. V. 1,000 | S. V. 2,000 | S. V. 5,000 |
| 80 | 98 | 95 | 94 | 92 |
| 56.5 | 100 | 98 | 90 | 80 |

*Example 5.*—10 cc. of activated alumina were impregnated with 0.1 g. of platinum as platinic chloride dissolved in 100 cc. of water. The alumina having the platinic chloride dispersed thereon was reduced for one hour in a stream of hydrogen and then treated with sodium formate solution (10 cc. of 10% concentration) and heated on a water bath at 100° C. for one hour to complete precipitation and reduction of the platinum to the metallic state. The resulting dark gray material was washed and dried at 100° C. This preparation gave equilibrium conversions at 56.5° C. at space velocities up to 500.

*Example 6.*—Steam-activated coconut charcoal impregnated with the quantities of palladium metal indicated below per 100 cc. apparent volume of charcoal gave the indicated percent of equilibrium conversion at the indicated temperatures and space velocities:

| g. Pd/100 cc. | Percent of Equilibrium Conversion | | | | | | | |
|---|---|---|---|---|---|---|---|---|
| | S. V. 5,000 | | S. V. 10,000 | | S. V. 20,000 | | S. V. 50,000 | |
| | 80° | 56.5° | 80° | 56.5° | 80° | 56.5° | 80° | 56.5° |
| 2 | 89 | 74 | 71 | 61 | 50 | 44 | 14 | 40 |
| 1 | 74 | 63 | 45 | 44 | 38 | 34 | 27 | 23 |
| 0.4 | 28 | 44 | 17 | 26 | 12 | 19 | 9 | 14 |

*Example 7.*—A nickel-chromia catalyst was prepared in the following manner: a mixture of nickel and chromium nitrates in solution was treated with ammonium carbonate to precipitate the nickel and chromium as a mixed carbonate and the precipitate washed, dried and reduced in hydrogen at 350° C. The resulting material contained 27% nickel and when tested in the manner described above gave the following percent of equilibrium conversions:

| Temp., ° C. | Percent of Equilibrium Conversion | | | | |
|---|---|---|---|---|---|
| | S. V. 100 | S. V. 500 | S. V. 1,000 | S. V. 3,000 | S. V. 6,000 |
| 80 | 100 | 98 | 94 | 80 | 76 |
| 64.6 | 96 | 53 | 41.5 | 21 | |
| 56.5 | 96 | 52 | 34.5 | 45.5 | |

*Example 8.*—A nickel catalyst with ceria as a supporting oxide was prepared containing 50 molar percent nickel and the residue cerium oxide. This catalyst when tested gave the following percent of equilibrium conversion at the indicated temperatures and space velocities:

| Temp., °C. | Percent of Equilibrium Conversion | | | |
|---|---|---|---|---|
| | S. V. 1,000 | S. V. 2,000 | S. V. 4,000 | S. V. 10,000 |
| 80 | 100 | 98 | 98 | 95 |
| 56.5 | 100 | 100 | 100 | 95 |

*Example 9.*—A number of metal chromites were prepared by ignition of the corresponding metal ammonium chromate followed by reduction in hydrogen at temperatures between 250° C. and 380° C. Some of the results obtained are as follows:

Copper chromite reduced at 380° C. when tested at a space velocity of 6,000 and a temperature of 80° C. gave 85% of equilibrium conversion at a steam-hydrogen ratio of 1:2.16.

Zinc chromite reduced at 380° C. gave 25% of equilibrium conversion at 80° C. and a space velocity of 1,500 with a water vapor-hydrogen ratio of about 1:1.5.

As pointed out heretofore, it is desirable in the case of the metal chromite catalysts to use a relatively small water vapor-hydrogen ratio. Such a small ratio may be obtained by operating the saturator at a relatively low temperature, for example, by operating the saturator at 20° C. to 30° C. and the reactor at 80° C. to 90° C. Alternatively, small water vapor-hydrogen ratios may be obtained by maintaining the saturator at about the temperature of the reactor but using superatmospheric pressure of say two to three atmospheres.

*Example 10.*—A quantity of hydrogen containing 25 parts per thousand of HD was saturated with distilled water having the natural abundance of deuterium and passed over a catalyst of the type described in Example 1. Since the gas contained more than the equilibrium concentration of deuterium, the exchange reaction proceeded in the opposite direction from those of Examples 1 to 9. Equilibrium conversions were obtained at space velocities up to 60,000 at temperatures of 80° C., 64.5° C., and 56.5° C.

From the foregoing data it is apparent that the reaction rate attained with the vapor phase reaction of the present invention is very much greater than that obtained when the exchange reaction is carried out between hydrogen and liquid water. Thus, for example, when the catalyst of Example 1 is used to catalyze an exchange between hydrogen containing deuterium and liquid water, only 50% of equilibrium conversion is attained even with space velocities as low as 450. Under favorable conditions the method of the present invention produces reaction rates of the order of several hundred times the reaction rate obtainable with hydrogen and liquid water. In some cases, equilibrium conversions have been obtained at space velocities in excess of 100,000.

It has been found that the preferred catalysts prepared in the manner described above show substantially no impairment of activity over months of operation when pure reactants are used. However, when the reacting materials are impure, the activity of the catalyst may drop off rapidly. Poisons for most of the above catalysts include sulfur-containing gases, such as hydrogen sulfide and sulfur dioxide, and carbon monoxide and hence it is desirable that the reactants be as nearly free from these materials as possible.

It has been further found that the catalyst mass should be kept free from liquid water. When the catalyst is permitted to adsorb water to such an extent as to form a film of adsorbed water molecules thereon, the activity of the catalyst is substantially impaired and falls to values roughly of the order of those obtained in the exchange reaction between hydrogen gas and liquid water. In order to avoid formation of such adsorbed films of water on the catalyst, it has been found desirable to heat the vapor mixture after it leaves the saturator and before it comes in contact with the catalyst mass to make sure that the vapor is slightly super-heated when it comes in contact with the catalyst. Alternatively, the catalyst itself may be heated to an extent sufficient to prevent undue adsorption of water on the catalyst surface. The increase in temperature need not be very great, one or two degrees having been found to be sufficient in most cases.

Figure 2:
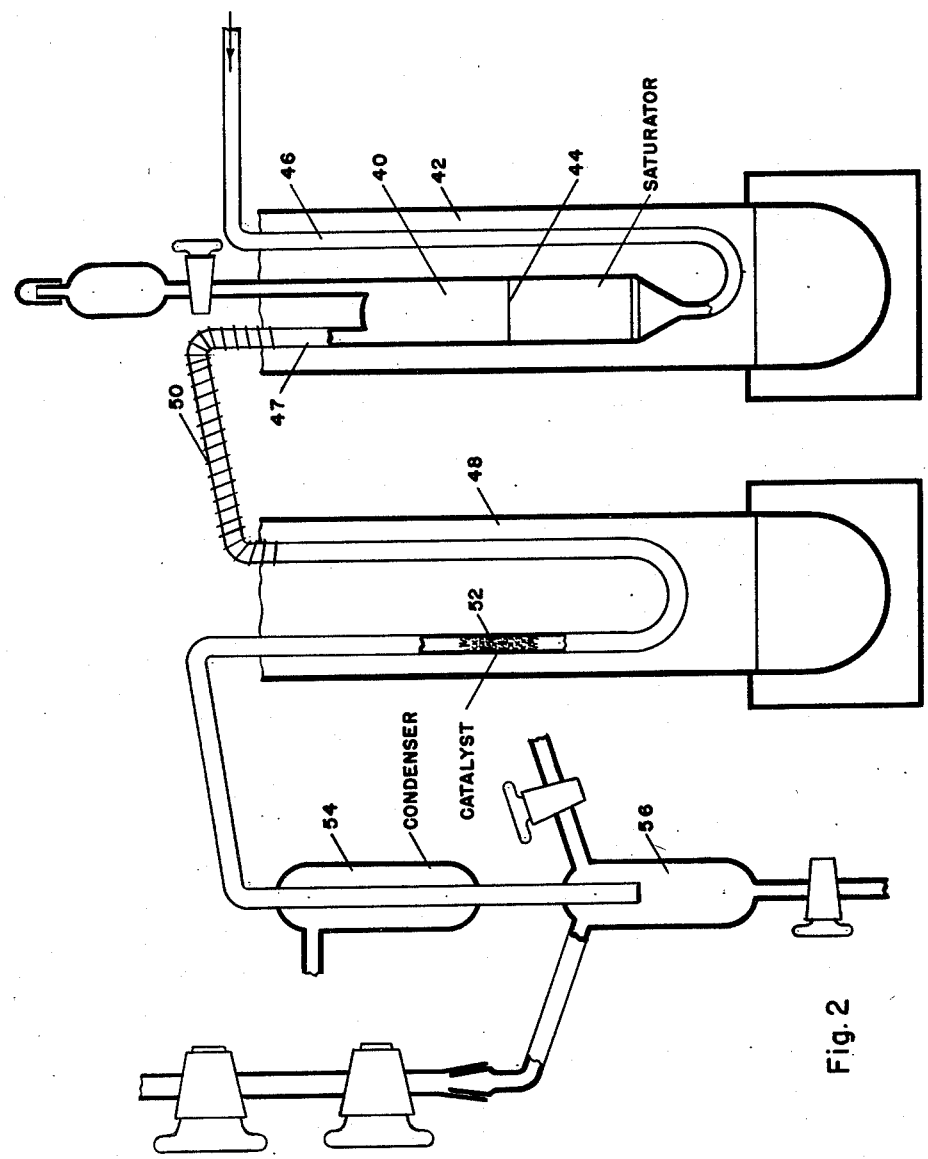
Fig. 2 is a diagrammatic view of apparatus similar to the apparatus of Fig. 1 but including means for heating the vapor mixture before it passes over the catalyst.

Apparatus including means for heating the saturated vapors to prevent condensation on the catalyst surfaces is disclosed in Fig. 2 of the drawings. The numeral 40 designates a saturator similar in function to the saturator 10 of Fig. 1 located in a vapor bath 42 which maintains the saturator 40 at a desired constant temperature. A liquid level is maintained in the saturator at 44 and hydrogen gas passes through the conduit 46 to the bottom of the saturator and bubbles up through the water in the saturator. The water vapor-saturated hydrogen leaves the saturator 40 through conduit 47 and passes into a second vapor bath 48 which is maintained at a temperature a few degrees higher, for example about 4° C. higher, than the vapor bath 42. A heating coil 50, which may be a winding of resistance wire, is provided to supply heat to the vapors passing through the conduit and prevent condensation of liquid in the conduit. Within the vapor bath 48 the vapors are super-heated with respect to the dew point and come in contact with the catalyst 52 to cause the exchange reaction to take place. Vapors leaving the catalyst pass to a condenser 54 and the condensate is collected in a condensate trap 56 as in the case of the apparatus shown in Fig. 1.

With the apparatus of Fig. 2 the vapor mixture prior to coming in contact with the catalyst is super-heated to the desired degree to preclude the possibility of condensation of liquid water on the catalyst surface, thereby insuring maintenance of the high conversion rates which are obtainable by utilizing the vapor phase reaction of the present invention.

It should be noted that the gas need not be saturated with water vapor and that the exchange reaction may be carried out with the gas saturated to the extent of say 75% of saturation. However, it is apparent that other factors being held constant, a reduction in the proportion of water vapor in the gaseous mixture reduces the overall transfer of deuterium to the water vapor in a single-exchange unit. When the gas is not saturated with respect to water vapor, that is, when the partial pressure of water vapor in the gaseous mixture is appreciably less than the vapor pressure of water at that temperature, the heating step described above may be omitted since under such circumstances there is no danger of formation of liquid water on the catalyst surfaces.

Figure 3:
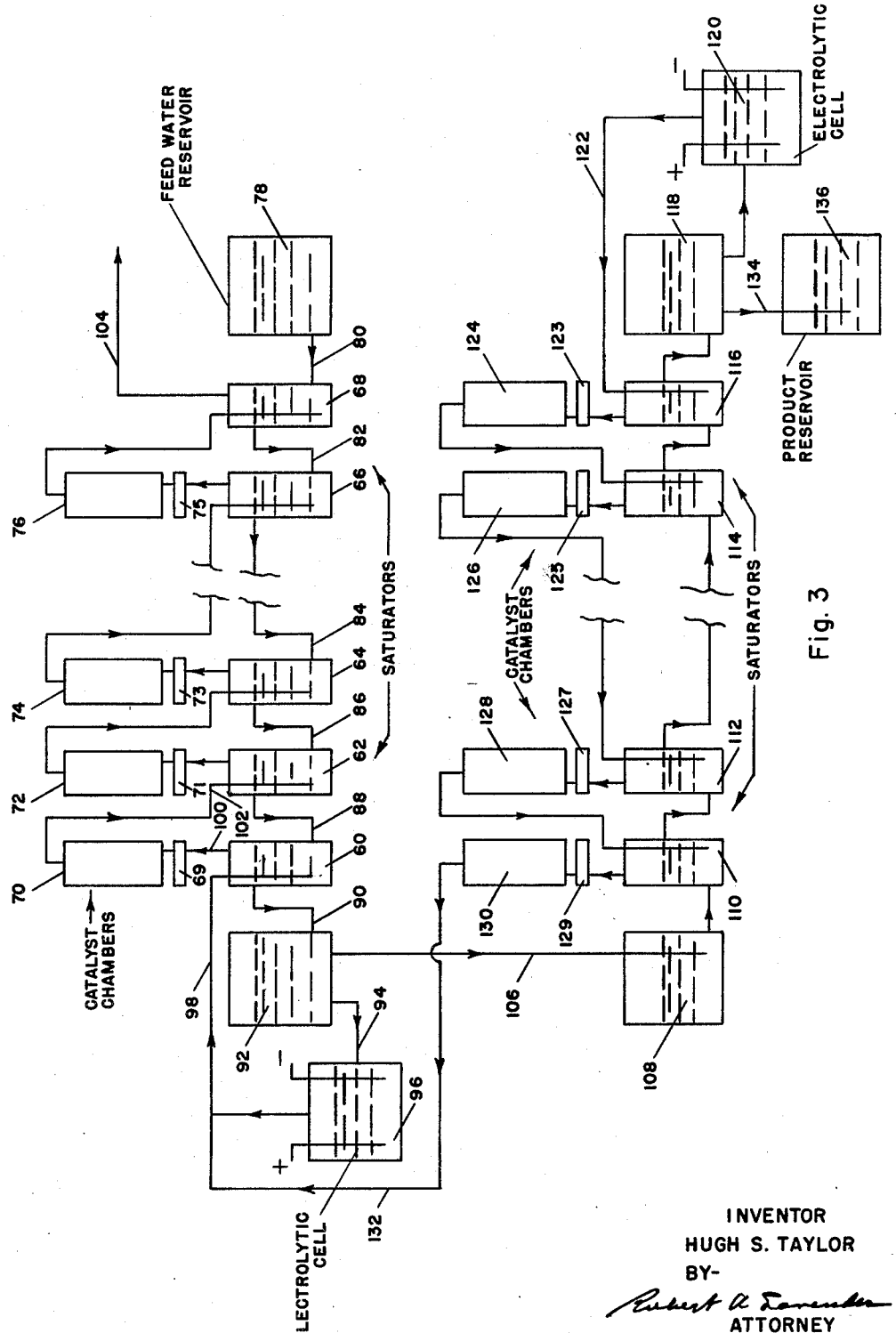
Fig. 3 is a diagrammatic view showing an arrangement of single-exchange units in a system for effecting concentration of the deuterium-containing species in water.

The method of the present invention is particularly well adapted for fully continuous operation and the way in which the present method may be carried out on a continuous scale is indicated in Fig. 3. In order to effect a desired increase in concentration of the deuterium-containing species in water, it is desirable to arrange a number of the single-exchange units previously described in one or more series or stages as indicated in Fig. 3. In general, such a concentration of the deuterium-containing species may be accomplished by passing hydrogen countercurrently through successive bodies of water having successively decreasing concentrations of the deuterium-containing species to cause the hydrogen leaving each body of water to contain water vapor having approximately the same concentration of the deuterium-containing species as the body of water which it leaves and intermittently passing the water vapor-hydrogen mixture over a catalyst mass to cause an exchange of isotopes to take place between the hydrogen and water vapor in the absence of liquid water.

Referring to Fig. 3, there is shown a flow diagram for a two stage system for concentrating the deuterium-containing species in water in accordance with the method of the present invention. The numerals 60, 62, 64, 66, and 68 designate saturating chambers similar in function to the saturator 10 of Fig. 1 and the numerals 70, 72, 74, and 76 designate catalyst chambers similar in function to the catalyst chamber 12 of Fig. 1. As indicated by the broken lines in Fig. 3, the different series or stages may consist of different numbers of single-exchange units.

Pure liquid water, preferably distilled water, containing the natural abundance of the deuterium species flows at a controlled rate from a reservoir 78 through conduit 80 to the saturator 68, then overflows into conduit 82 and passes to the saturator 66 and thence successively to the saturators 64, 62, and 60 through connecting conduits 84, 86, and 88. In each saturator the water is enriched with respect to the deuterium-containing species in the manner described below by being brought into contact with water vapor which is relatively richer in this species.

From the saturator 60 water passes through conduit 90 to an enriched water reservoir 92. A portion of the enriched water from the reservoir 92 passes through conduit 94 to an electrolytic cell 96 wherein the water is decomposed by electrolysis to produce hydrogen which is relatively rich in deuterium.

The deuterium-containing hydrogen from the cell 96 is caused to flow back through the system in a direction generally countercurrent to the flow of water. From the cell 96 hydrogen flows through conduit 98 to the saturator 60 where it becomes saturated with water vapor having somewhat less than the equilibrium concentration of the deuterium-containing species. The hydrogen gas saturated with water vapor then flows through conduit 100 and heater 69 to the catalyst chamber 70 wherein the desired exchange of isotopes takes place. The heater 69 supplies sufficient heat to the vapor-gas mixture to ensure that no liquid water will condense on the catalyst surfaces. The effluent vapors composed of hydrogen which has been partially depleted of its deuterium content and water vapor which has been enriched with respect to deuterium pass through conduit 102 to the saturator 62 which contains water that is poorer in deuterium than the water vapor associated with the entering hydrogen. In the saturator 62 the gas bubbles into the water in the saturator and a vapor-liquid exchange takes place to establish a new equilibrium such that the water vapor associated with the hydrogen gas and the liquid water in the saturator contain the same, or substantially the same, concentration of the deuterium-containing species. The result of this interchange is that the vapor phase is depleted with respect to deuterium and the liquid phase is enriched with respect to deuterium. The overall effect of the above-described operation is that in the catalyst chamber deuterium passes from hydrogen to water vapor and in the saturator deuterium passes from water vapor to liquid water.

Water vapor-saturated hydrogen from the saturator 62 passes successively through heater 71, catalyst chamber 72, saturator 64, heater 73, catalyst chamber 74, saturator 66, heater 75, catalyst chamber 76, saturator 68, and then leaves the system through conduit 104. In a properly designed system with selected flow rates the effluent hydrogen will have a deuterium concentration substantially less than that of the feed water.

As indicated in Fig. 3, a portion of the enriched water from reservoir 92 passes through conduit 106 to the second stage of the concentrating system and more particularly to a feed tank 108. The operation of the second stage is similar to that of the first stage. The enriched water from the feed tank 108 passes successively to the saturators 110, 112, 114, and 116 wherein it is successively enriched with respect to deuterium and thence to the reservoir 118. A portion of the water from reservoir 118 flows to electrolytic cell 120 where it is electrolyzed to produce hydrogen relatively rich in deuterium. This hydrogen leaves the electrolytic cell through conduit 122 and flows back through the second stage in a direction countercurrent to the flow of liquid water. Specifically, the hydrogen flows through saturator 116, heater 123, catalyst chamber 124, saturator 114, heater 125, catalyst chamber 126, saturator 112, heater 127, catalyst chamber 128, saturator 110, heater 129, and catalyst chamber 130, and then is returned as hydrogen feed to the first stage through conduit 132.

A portion of the enriched water from the reservoir 118 passes through conduit 134 to a product reservoir 136. It is evident that the system may comprise more than the two stages shown in Fig. 3, in which case the reservoir 136 might form a feed tank for a third stage. The number of stages used will depend upon the extent to which it is desired to concentrate the deuterium-containing species in the water.

Where the method of the present invention is to be used on a large scale to concentrate, for example, the deuterium-containing species in water, it may be desirable to make use of some of the well-known techniques and apparatus for effecting equilibrium between a liquid and a gas such as, for example, the techniques of fractional distillation and the well-known fractionating towers of the bubble cap or packed type. Thus, the bubble cap trays in a conventional fractionating tower may be used as saturators and the water caused to flow downwardly through the tower with hydrogen gas flowing countercurrently up through the tower. Catalyst chambers may be built into the tower at appropriate points to effect an exchange reaction between the hydrogen and water vapor at desired points within the tower. In this way the single exchange units of Fig. 3 may be built into a unitary structure comprising a single stage of the system and a number of towers each with its own electrolytic cell or cells may be arranged in series to give a compact multistage system.

It is to be understood that the method of the present invention is not limited to the detailed procedure described above. The purpose of the electrolytic cells 96 and 120 is to convert the enriched water into hydrogen to provide a source of enriched hydrogen for the exchange system. Any other suitable method for decomposing the enriched water may be used. An advantage of the electrolytic method, however, is that it produces a relatively pure hydrogen. The importance of using pure reactants to avoid catalyst poisoning has been previously pointed out.

It is not necessary that the number of catalyst chambers and saturators be equal. In some cases, for example, it may be desirable to use two or three saturators for each catalyst chamber in order to make sure that the gas coming in contact with the catalyst mass is saturated with water vapor having the composition of the water in the saturator.

As pointed out above, the number of exchange units in each stage and the number of stages may be varied. The number of single-exchange units used in each stage depends essentially upon the flow rates used and their relationship to the degree of enrichment desired in each stage. If very high flow rates are used, equilibrium conditions may not be attained in the individual exchange units and therefore a greater number of exchange units will be required to obtain a given enrichment of the water and depletion of the hydrogen gas.

The criteria for determining how many single-exchange units should be used per stage, how many stages should be used, and what flows should be used in particular cases are, in general, analogous to the criteria for determining similar factors in the art of fractional distillation. Specific values may be arrived at by using obvious modifications of calculative techniques that are well-known to those skilled in the art. For example, it may be pointed out that the ratio of flow of enriched water to the electrolytic cell to the flow of water which passes on to the next succeeding stage is somewhat analogous to the reflux ratio of a conventional fractionating tower. As the ratio is increased, for example, the quantity of energy supplied to the electrolytic cell per unit quantity of product increases and vice versa. Also, as this ratio increases, the concentration of the deuterium-containing species in the product increases and vice versa. The choice of a flow ratio will depend upon such factors as cost of electrical energy, cost of equipment, and the like.

The number of exchange units to be used in a given case may be arrived at by methods analogous to those employed in determining the number of trays to be used in a fractionating tower, namely, by computing the theoretical number of units required to achieve a given concentration of the deuterium-containing species assuming attainment of complete equilibrium and then increasing the theoretical number of units by a factor based on an estimate of the percent of equilibrium that will probably be attained under the particular conditions of operation. Equilibrium conditions for the catalyst chamber are sufficiently set forth in the specific examples given above. Equilibrium conditions for saturator operation may be determined from existing published data on vapor-liquid equilibria.

From the above description it is apparent that the present method provides an unusually effective way of concentrating the deuterium-containing species in water. By causing the exchange reaction to proceed in the vapor phase, a relatively high reaction rate is attainable and since the reaction is carried out below the boiling point of water, the equilibrium distribution of deuterium is more favorable than it would be if the exchange reaction were carried out at higher temperatures.

In addition to the more favorable distribution of deuterium obtained, there are a number of other advantages which result from operation at low temperatures in accordance with the present method. Thus, the low temperature operation facilitates recovery of the enriched water. When the exchange reaction is carried out at a temperature within the preferred range of 45° C. to 90° C., the vapor mixture leaving the catalyst mass may be passed directly into liquid water to equalize the deuterium concentrations in the water vapor and liquid water. If, on the other hand, the exchange reaction were carried out at a temperature above the boiling point of water, the additional step of cooling the gaseous mixture and/or condensing the enriched water vapor would be necessary. Similarly, when carrying out the reaction at high temperatures, it would be necessary to either convert liquid water into steam and add the steam to the gas to form the desired mixture or else saturate the gas by passing it through liquid water and then supply a relatively large amount of heat to the gaseous mixture to bring it up to the reaction temperature. In the present method where the exchange reaction is carried out at relatively low temperatures, no large amount of heat need be added to the vapor-gas mixture. It is thus apparent that the present method utilizing a low temperature exchange makes it possible to effect a concentration of the deuterium-containing species in water in a compact apparatus and on a fully continuous scale and that the heat requirements of the method are low.

A further advantage of low temperature operation is that heat losses are thereby reduced.

The foregoing description has been for the most part phrased in terms of the concentration of the deuterium-containing species is water. As pointed out at the beginning of the present specification, the method of the present invention may also be used to concentrate other desired isotopes in other media as well. The following additional specific examples are given to illustrate some of the other cases where the present method may be effectively used.

*Example 11.*—An activated coconut charcoal containing 10% by weight of platinum metal was placed in a single-exchange unit of the type shown in Fig. 2 of the drawings. Methyl alcohol was supplied to the saturator and hydrogen enriched with respect to deuterium was bubbled through the methanol at such a temperature as to give a hydrogen-methanol saturation ratio of 3:1 by volume. The hydrogen substantially saturated with methanol vapor was passed over the catalyst at 56° C. and at a space velocity of 15,000. It was found that when the inlet hydrogen contained 1.5% HD, the effluent concentration due to reaction with methanol was 0.7% HD. This corresponds to an exchange of about 90% of equilibrium.

*Example 12.*—Exchange reactions were carried out in a single-exchange unit utilizing as a catalyst an activated coconut charcoal containing 2½% by weight of platinum metal and mixtures of enriched hydrogen and cyclohexane vapor in volume ratios of from 6:1 to 1:1 at temperatures of 110° C., 157° C., and 184° C. and space velocities of 500 to 1,000. At 184° C. within these ratios of hydrogen and cyclohexane, isotopic equilibrium was established. At the lower temperatures, an exchange took place but did not proceed to complete equilibrium at the indicated space velocities.

Hydrogen enriched with respect to deuterium may be recovered from cyclohexane in a continuous process by making use of the following well-known reaction:

$$C_6H_{12} \rightleftarrows C_6H_6 + 3H_2$$

This reaction proceeds to the right at temperatures of the order of 300° C. to 350° C. to give benzene and hydrogen and proceeds to the left at temperatures of 100° C. to 150° C. to give cyclohexane. Thus the cyclohexane from the exchange reaction may be decomposed to give hydrogen relatively rich in deuterium and the benzene formed may be rehydrogenated at a lower temperature to produce cyclohexane which may be recycled.

As pointed out above, the exchange reaction between hydrogen and water vapor when carried out at atmospheric pressure proceeds so rapidly that it is not ordinarily necessary to resort to the use of superatmospheric pressures. It should be noted, however, that in some cases, as in Example 12, desirable space velocities are obtained only with temperatures at or above the atmospheric pressure boiling point of the less volatile material and therefore, in order to cary out the exchange reaction efficiently in a continuous manner in accordance with the present method, it is desirable that the exchange tower or towers be operated at a pressure sufficiently high to maintain the less volatile material in a liquid state in the saturators at the desired higher temperature. Thus, for example, an exchange system for effecting an exchange of deuterium between hydrogen and cyclohexane may be operated at a temperature of 150° C. and a total pressure of 27 atmospheres. Since the vapor pressure of cyclohexane at 150° C. is about 5.4 atmospheres, the vapor mixture passing to the catalyst bed contains hydrogen and cyclohexane in the ratio of approximately 4:1. It is apparent that with these operating conditions the exchange reaction is carried out well below the boiling point of cyclohexane at the pressure existing in the system.

Since many embodiments might be made of the present invention and since many changes might be made in the preferred embodiments described above, it is to be understood that the foregoing description is to be interpreted as illustrative only and not in a limiting sense, except as required by the appended claims.

I claim:

1. A method of concentrating a desired isotopic species of an element in a liquid by exchange of isotopic species between vapor of said liquid and a gas wherein both said liquid and said gas contain said element and both are capable of containing said desired isotopic species and at least one other isotopic species of said element, comprising the steps of passing said gas countercurrently through successive bodies of said liquid, causing said gas to mix intimately with said liquid, whereby the gas leaving each of said liquid bodies is associated with vapor of said liquid containing approximately the same concentration of said desired isotope as is contained in said liquid body, and intermittently passing said gas and associated vapor over catalyst masses to cause an exchange of isotopic species to take place between said gas and vapor, whereby the concentration of one of said isotopic species in said gas is successively increased.

2. A method of concentrating a desired isotopic species of an element in a liquid by exchange of isotopic species between vapor of said liquid and a gas which is relatively rich in said desired isotopic species and wherein both said liquid and said gas contain said element and both are capable of containing said desired isotopic species and at least one other isotopic species of said element, comprising the steps of passing said gas countercurrently through successive bodies of said liquid having successively decreasing concentrations of said desired isotope, causing said gas to mix intimately with said liquid bodies, whereby the gas leaving each of said liquid bodies is associated with vapor of said liquid containing approximately the same concentration of said desired isotope as the liquid which it is leaving, and intermittently passing the gas and associated vapor leaving said liquid bodies over catalyst masses to cause an exchange of isotopic species to take place between said gas and said vapor, whereby said gas is continuously depleted with respect to said desired isotope and said liquid is continuously enriched with respect to said desired isotope.

3. A method of increasing the concentration of the deuterium-containing species in water by exchange of isotopic species between water vapor and hydrogen gas that is relatively rich in deuterium which comprises passing said hydrogen countercurrently through successive bodies of water having successively decreasing concentrations of deuterium oxide, causing said hydrogen to mix intimately with said bodies of water, whereby the gas leaving each of said bodies is associated with water vapor having a deuterium concentration approximately the same as that of the body of water which it is leaving, and intermittently passing said hydrogen and associated water vapor over catalyst masses to produce an exchange of isotopic species between said hydrogen and said water vapor, whereby said hydrogen is successively depleted with respect to deuterium and enriches with respect to deuterium the successive bodies of water with which it comes in contact.

4. A method of increasing the concentration of the deuterium-containing species in water by exchange of isotopic species between water vapor and hydrogen gas that is relatively rich in deuterium which comprises passing said hydrogen countercurrently through successive bodies of water having successively decreasing concentrations of deuterium oxide, causing said hydrogen to mix intimately with said bodes of water, whereby the gas leaving each of said bodies is associated with water vapor having a deuterium concentration approximately the same as that of the body of water which it is leaving, and intermittently passing said hydrogen and associated water vapor at a temperature between 45°

C. and 90° C. over catalyst masses to produce an exchange of isotopic species between said hydrogen and said water vapor, whereby said hydrogen is successively depleted with respect to deuterium and enriches with respect to deuterium the successive bodies of water with which it comes in contact.

5. A method of increasing the concentration of the deuterium-containing species in water by exchange of isotopic species between water vapor and hydrogen gas that is relatively rich in deuterium which comprises passing said hydrogen countercurrently through successive bodies of water having successively decreasing concentrations of deuterium oxide, causing said hydrogen to mix intimately with said bodies of water, whereby the gas leaving each of said bodies is associated with water vapor having a deuterium concentration approximately the same as that of the body of water which it is leaving, and intermittently passing said hydrogen and associated water vapor at a temperature between 45° C. and 90° C. over a catalyst selected from the group consisting of noble metals, base metals and heavy metal chromites to produce an exchange of isotopic species between said hydrogen and said water vapor, whereby said hydrogen is successively depleted with respect to deuterium and enriches with respect to deuterium the successive bodies of water with which it comes in contact.

6. A method of increasing the concentration of the deuterium-containing species in water by exchange of isotopic species between water vapor and hydrogen gas that is relatively rich in deuterium which comprises causing said water to flow successively through a series of saturators containing bodies of water, electrolyzing a portion of the water leaving the last saturator of the series to produce hydrogen which is relatively rich in deuterium, and passing said hydrogen countercurrently and successively through the bodies of water in said saturators, causing said hydrogen to mix intimately with said bodies of water whereby the gas leaving each of said saturators is associated with water vapor having a deuterium concentration approximately the same as that of the body of water which it is leaving, intermittently passing said hydrogen and associated water vapor over a catalyst to produce an exchange of isotopic species between said hydrogen and said water vapor whereby said hydrogen is successively depleted with respect to deuterium and enriches with respect to deuterium the successive bodies of water with which it comes in contact, and removing as product the unelectrolyzed portion of water leaving the last saturator of the series.

7. A method of increasing the concentration of the deuterium-containing species in water by exchange of isotopic species between water vapor and hydrogen gas that is relatively rich in deuterium which comprises causing said water to flow successively through a series of saturators containing bodies of water, electrolyzing a portion of the water leaving the last saturator of the series to produce hydrogen which is relatively rich in deuterium and passing said hydrogen countercurrently and successively through the bodies of water in said saturators, causing said hydrogen to mix intimately with said bodies of water at a temperature between 45° C. and 90° C. whereby the gas leaving each of said saturators is associated with water vapor having a deuterium concentration approximately the same as that of the body of water which it is leaving, intermittently passing said hydrogen and associated water vapor at a temperature between 45° C. and 90° C. over a catalyst to produce an exchange of isotopic species between said hydrogen and said water vapor, whereby said hydrogen is successively depleted with respect to deuterium and enriches with respect to deuterium the successive bodies of water with which it comes in contact, and removing as product the unelectrolyzed portion of water leaving the last saturator of the series.

8. A method of concentrating a desired isotopic species of an element in a liquid by catalytic exchange of isotopic species between vapor of said liquid and a gas wherein both said liquid and said gas contain said element and both are capable of containing said desired isotopic species and at least one other isotopic species of said element, comprising the steps of passing said gas countercurrently through successive bodies of said liquid, causing said gas to mix intimately with said liquid whereby the gas leaving each of said liquid bodies is associated with the vapor of said liquid containing approximately the same concentration of said desired isotope as is contained in said liquid body, intermittently passing said gas and said associated vapor over catalyst masses to cause an exchange of isotopic species to take place between said gas and vapor, whereby the concentration of one of said isotopic species in said gas is successively increased, and heating the gas-vapor mixture passing to each of said catalyst masses to an extent sufficient to prevent condensation of said vapor on the surface of said catalyst.

9. A method of concentrating a desired isotopic species of an element in a liquid by catalytic exchange of isotopic species between vapor of said liquid and a gas which is relatively rich in said desired isotopic species and wherein both said liquid and said gas contain said element and both are capable of containing said desired isotopic species and at least one other isotopic species of said element, comprising the steps of passing said gas countercurrently through successive bodies of said liquid having successively decreasing concentrations of said desired isotope, causing said gas to mix intimately with said liquid whereby the gas leaving each of said liquid bodies is associated with vapor of said liquid containing approximately the same concentration of said desired isotope as the liquid which it is leaving, intermittently passing the gas and associated vapor leaving said liquid bodies over catalyst masses to cause an exchange of isotopic species to take place between said gas and said vapor, whereby said gas is continuously depleted with respect to said desired isotope and said liquid is continuously enriched with respect to said desired isotope, and heating said vapor-gas mixture before it passes over each of said catalyst masses to prevent condensation of said vapor on the surface of said catalyst.

10. In a method of increasing the concentration of the deuterium-containing species in water by catalytic exchange of isotopic species between water and a gas containing deuterium at a concentration in excess of that which it would contain when the water-gas system is in isotopic equilibrium, the steps of forming a mixture of said gas and the vapor of said water, heating said mixture to an extent sufficient to prevent condensation of said vapor during said catalytic exchange, passing said mixture over a catalyst at a temperature of 45° C. to 90° C. to cause an exchange of isotopic species to take place between said water vapor and said gas, condensing said water vapor, and separating the condensate from said gas as product.

11. A method of increasing the concentration of the deuterium-containing species in water by an exchange of isotopic species between water and hydrogen gas that is relatively rich in deuterium, which comprises passing said hydrogen countercurrently through successive bodies of water having successively decreasing concentrations of deuterium oxide, causing said hydrogen to mix intimately with said bodies of water whereby the gas leaving each of said bodies is associated with water vapor having a deuterium concentration approximately the same as that of the body of water which it is leaving, intermittently passing said hydrogen and associated water vapor over catalyst masses to produce an exchange of isotopic species between said hydrogen and water vapor, whereby said hydrogen is successively depleted with respect to deuterium and enriches with respect to deuterium the successive bodies of water with which it comes in contact, and heating the gas-vapor mixture before it passes over each catalyst mass to an extent sufficient to prevent condensation of said vapor on the surface of said catalyst.

12. A method of increasing the concentration of the deuterium-containing species in water by an exchange of isotopic species between water and hydrogen gas that is relatively rich in deuterium, which comprises passing said hydrogen countercurrently through successive bodies of water having successively decreasing concentrations of deuterium oxide, causing said hydrogen to mix intimately with said bodies of water whereby the gas leaving each of said bodies is associated with water vapor having a deuterium concentration approximately the same as that of the body of water which it is leaving, intermittently passing said hydrogen and associated water vapor over catalyst masses to produce an exchange of isotopic species between said hydrogen and water vapor, whereby said hydrogen is successively depleted with respect to deuterium and enriches with respect to deuterium the successive bodies of water with which it comes in contact, and heating the gas-vapor mixture before it passes over each catalyst mass to a temperature between 45° C. and 90° C. sufficient to prevent condensation of said vapor on the surface of said catalyst.

13. A method of concentrating a desired isotopic species of an element in a liquid by catalytic exchange of isotopic species between vapor of said liquid and a gas wherein both said liquid and said gas contain said element and both are capable of containing said desired isotopic species and at least one other isotopic species of said element, comprising the steps of passing said gas countercurrently through successive bodies of said liquid, causing said gas to mix intimately with said liquid whereby the gas leaving each of said liquid bodies is associated with the vapor of said liquid containing approximately the same concentration of said desired isotope as is contained in said liquid body, intermittently passing said gas and said associated vapor over catalyst masses to cause an exchange of isotopic species to take place between said gas and vapor, whereby the concentration of one of said isotopic species in said gas is successively increased, and heating said catalyst masses to an extent sufficient to prevent condensation of said vapor on the surface of said catalyst.

14. A method of increasing the concentration of the deuterium-containing species in water by an exchange of isotopic species between water and hydrogen gas that is relatively rich in deuterium, which comprises passing said hydrogen countercurrently through successive bodies of water having successively decreasing concentrations of deuterium oxide, causing said hydrogen to mix intimately with said bodies of water whereby the gas leaving each of said bodies is associated with water vapor having a deuterium concentration approximately the same as that of the body of water which it is leaving, intermittently passing said hydrogen and associated water vapor over catalyst masses to produce an exchange of isotopic species between said hydrogen and water vapor, whereby said hydrogen is successively depleted with respect to deuterium and enriches with respect to deuterium the successive bodies of water with which it comes in contact, and heating said catalyst masses to prevent condensation of said vapor on the surfaces of said catalyst.

15. In a method of increasing the concentration of the deuterium-containing species in water by a catalytic exchange of isotopic species between water and a gas containing deuterium at a concentration in excess of that which it would contain when the water-gas system is in isotopic equilibrium, the steps of forming a mixture of said gas and the vapor of said water, passing the resulting mixture at a temperature between 45° C. and 90° C. over a catalyst comprising a finely divided heavy metal chromite to cause an exchange of isotopic species to take place between said water vapor and said gas, condensing said water vapor to liquid water, and separating said water and said gas.

16. In a method of increasing the concentration of the deuterium-containing species in water by a catalytic exchange of isotopic species between water and a gas containing deuterium at a concentration in excess of that which it would contain when the water-gas system is in isotopic equilibrium, the steps of forming a mixture of said gas and the vapor of said water, passing the resulting mixture at a temperature between 45° C. and 90° C. over a catalyst comprising finely divided metallic platinum on a substratum of activated charcoal to cause an exchange of isotopic species to take place between said water vapor and said gas, condensing said water vapor to liquid water, and separating said water and said gas.

17. A method of concentrating deuterium in a fluid selected from the group consisting of water and a gas containing hydrogen by exchange of the isotopic species deuterium and protium between water vapor and said gas, comprising the steps of passing said gas countercurrently through successive bodies of liquid water, causing said gas to mix intimately with said liquid water whereby the gas leaving each of said liquid water bodies is associated with water vapor containing approximately the same concentration of deuterium as is contained in said liquid body, and intermittently passing said gas and said associated water vapor over catalyst masses to cause an exchange of isotopic species to take place between said gas and said water vapor, whereby the concentration of one of said isotopic species in said gas is successively increased.

References Cited in the file of this patent
UNITED STATES PATENTS

| Number | Name | Date |
|---|---|---|
| 2,156,851 | Hansgirg | May 2, 1939 |